US010043476B2

(12) United States Patent
Cao

(10) Patent No.: US 10,043,476 B2
(45) Date of Patent: Aug. 7, 2018

(54) DISPLAY PANEL AND ANGLE-CUTTING CIRCUIT

(71) Applicant: Shenzhen China Star Optoelectronics Technology Co., Ltd., Shenzhen, Guangdong (CN)

(72) Inventor: Dan Cao, Guangdong (CN)

(73) Assignee: Shenzhen China Star Optoelectronics Technology Co., Ltd, Shenzhen, Guangdong (CN)

( * ) Notice: Subject to any disclaimer, the term of this patent is extended or adjusted under 35 U.S.C. 154(b) by 202 days.

(21) Appl. No.: 15/112,149

(22) PCT Filed: Jun. 23, 2016

(86) PCT No.: PCT/CN2016/086810
§ 371 (c)(1),
(2) Date: Jul. 15, 2016

(87) PCT Pub. No.: WO2017/206219
PCT Pub. Date: Dec. 7, 2017

(65) Prior Publication Data

US 2018/0166038 A1 Jun. 14, 2018

(30) Foreign Application Priority Data

Jun. 1, 2016 (CN) ........................ 2016 1 03841027

(51) Int. Cl.
*G09G 3/36* (2006.01)
*G02B 6/12* (2006.01)
(Continued)

(52) U.S. Cl.
CPC ... *G09G 3/3696* (2013.01); *G09G 2300/0871* (2013.01)

(58) Field of Classification Search
CPC ...... G09G 3/3696; G02B 6/25; G02B 6/0083; G02B 6/12; G02B 6/13; G02B 6/132
See application file for complete search history.

(56) References Cited

U.S. PATENT DOCUMENTS 8,599,123 B2 12/2013 Guo et al.
8,902,203 B2 12/2014 Hsu et al.
(Continued)

FOREIGN PATENT DOCUMENTS

CN 1544975 A 11/2004
CN 101699552 A 4/2010
(Continued)

*Primary Examiner* — Kevin M Nguyen
(74) *Attorney, Agent, or Firm* — Andrew C. Cheng

(57) ABSTRACT

The present application discloses a display panel and an angle-cutting circuit. The angle-cutting circuit includes the angle-cutting chip, the comparison module and the adjustment module, the adjustment module is coupled to the angle-cutting chip and the comparison module; the output terminal of the angle-cutting chip is used to output the angle-cutting voltage, the first input terminal of the comparison module is coupled to the output terminal of the angle-cutting chip to obtain the first voltage; the first voltage is compared to the preset threshold voltage in the comparison module, when the first voltage is less than the threshold voltage, a control signal is generated from the comparison module, and the lower limit value of the angle-cutting voltage is raised by the adjustment module according to the control signal. By the technology described above, the accuracy of angle-cutting voltage of the present application is increased, and improve product performance.

12 Claims, 2 Drawing Sheets

(51) Int. Cl.
*G02B 6/13* (2006.01)
*G02B 6/25* (2006.01)

(56) References Cited

U.S. PATENT DOCUMENTS

| | | | | |
|---|---|---|---|---|
| 9,135,879 | B2 | 9/2015 | Chen | |
| 2005/0201668 | A1* | 9/2005 | Neta | G02B 6/4207 385/14 |
| 2010/0258909 | A1* | 10/2010 | Hoyt | H01C 7/006 257/536 |
| 2013/0193939 | A1* | 8/2013 | Sakaguchi | H02H 9/02 323/277 |
| 2013/0308061 | A1* | 11/2013 | Murakami | H02M 3/1582 348/730 |
| 2014/0145922 | A1 | 5/2014 | Chen | |

FOREIGN PATENT DOCUMENTS

| | | | |
|---|---|---|---|
| CN | 105590610 | A | 5/2016 |
| CN | 105609080 | A | 5/2016 |

* cited by examiner

DISPLAY PANEL AND ANGLE-CUTTING CIRCUIT

FIELD OF THE INVENTION

The present application relates to the technology of an angle-cutting of the display panel, and more particularly to a display panel and an angle-cutting circuit.

BACKGROUND OF THE INVENTION

The substrate of the display panel in the conventional technology realizes angle-cutting by an angle-cutting means. The first lower limit value of the angle-cutting voltage is preset in the angle-cutting means.

The angle-cutting means currently used includes at least one comparator, since the comparator having a delay period, such as that the comparator having a delay period in the output flip. The angle-cutting voltage becomes the second lower limit value in the actual angle-cutting means, and the second lower limit value is less than the first lower limit value. Therefore the accuracy of angle-cutting voltage is deterioration, leading to the deterioration of product performance.

SUMMARY OF THE INVENTION

The technology problem in the present application is to provide a display panel and angle-cutting circuit to solve the issued mentioned above.

In other to solve the technology problem mentioned above, the present application provides an angle-cutting circuit includes an angle-cutting chip, a comparison module and an adjustment module; wherein the adjustment module is coupled to the angle-cutting chip and the comparison module; the output terminal of the angle-cutting chip is used to output the angle-cutting voltage, the first input terminal of the comparison module is coupled to the output terminal of the angle-cutting chip to obtain the first voltage; the first voltage is compared to the preset threshold voltage in the comparison module, when the first voltage is less than the threshold voltage, a control signal is generated from the comparison module, and the lower limit value of the angle-cutting voltage is raised by the adjustment module according to the control signal.

Wherein the comparison module including a first comparator, a first resistor and a second resistor, one terminal of the first resistor is connected to the output terminal of the angle-cutting chip, the other terminal of the first resistor is grounded through the second resistor, a first input terminal of the first comparator is connected between the first resistor and the second resistor, the second input terminal of the first comparator input a threshold voltage.

Wherein the adjustment module including a first switch, a second switch, a third resistor, a fourth resistor, a fifth resistor and a sixth resistor; a first terminal of the first switch is connected to the output terminal of the first comparator, a second terminal of the first switch and a second terminal of the second switch are ground; a third terminal of the first switch receives a first reference voltage via the third resistor; a first terminal of the second switch is connected to the third terminal of the first switch; a third terminal of the second switch is connected to the input terminal of the angle-cutting chip through the fourth resistor; a terminal of the fifth resistor is ground; the other terminal of the fifth resistor is connected to a terminal of the sixth resistor and a terminal of the fourth resistor and the other terminal of the sixth resistor receives a second reference voltage.

Wherein the lower limit value of the angle-cutting voltage is 10 times of the input voltage input from the input terminal of the angle-cutting chip.

Wherein when the first voltage is less than the threshold voltage, the control signal output from the output terminal of the comparison module is in high electrical level; the first switch is turned on, the second switch is turn off, the lower limit value of the angle-cutting voltage satisfies the following equation:

$$VGH=10*V2*R5/(R5+R6)$$

wherein, VGH is the lower limit value of the angle-cutting voltage, V2 is the second reference voltage, R5 is the resistance value of the fifth resistor, R6 is the resistance value of the sixth resistor.

Wherein when the first voltage is greater than the threshold voltage, the output terminal of the comparison module outputs low electrical level, the first switch is turned off, and the second switch is turned on, the lower limit value of the angle-cutting voltage satisfies the following equation:

$$VGH=10*V2*R45/(R45+R6)$$

$$R45=R4*R5/R4+R5$$

Wherein, VGH is the lower limit value of the angle-cutting voltage, V2 is the second reference voltage, R4 is the resistance value of the fourth resistor, R5 is the resistance value of the fifth resistor, R6 is the resistance value of the sixth resistor.

Wherein the first switch and second switch are N-type MOS transistor, the first terminal is gate electrode, the second terminal is source electrode, and the third terminal is drain electrode.

Wherein the angle-cutting circuit further including an angle-cutting module connected to the output terminal of the angle-cutting chip, the angle-cutting module is cutting the angle of the substrate of the display panel according to the angle-cutting voltage.

Wherein the angle-cutting chip further including a second comparator, a seventh resistor, and an eighth resistor; the output terminal of the angle-cutting chip is ground through the seventh resistor and the eighth resistor; the first input terminal of the second comparator is connected between the seventh resistor and the eighth resistor; the second input terminal of the second comparator is connected to the input terminal of the angle-cutting chip; the output terminal of the second comparator is coupled to the reset terminal of the angle-cutting chip.

In other to solve the technology problem mentioned above, the present application further provides a display panel, including at least a substrate and an angle-cutting circuit, the angle-cutting circuit is used to cut the angle of the substrate, the angle-cutting circuit including: an angle-cutting chip, a comparison module and an adjustment module; wherein the adjustment module is coupled to the angle-cutting chip and the comparison module; the output terminal of the angle-cutting chip is used to output the angle-cutting voltage, the first input terminal of the comparison module is coupled to the output terminal of the angle-cutting chip to obtain the first voltage; the first voltage is compared to the preset threshold voltage in the comparison module, when the first voltage is less than the threshold voltage, a control signal is generated from the comparison module, and the lower limit value of the angle-cutting voltage is raised by the adjustment module according to the control signal.

Wherein the comparison module including a first comparator, a first resistor and a second resistor, one terminal of the first resistor is connected to the output terminal of the angle-cutting chip, the other terminal of the first resistor is grounded through the second resistor, a first input terminal of the first comparator is connected between the first resistor and the second resistor, the second input terminal of the first comparator input a threshold voltage.

Wherein the adjustment module including a first switch, a second switch, a third resistor, a fourth resistor, a fifth resistor and a sixth resistor; a first terminal of the first switch is connected to the output terminal of the first comparator, a second terminal of the first switch and a second terminal of the second switch are ground; a third terminal of the first switch receives a first reference voltage via the third resistor; a first terminal of the second switch is connected to the third terminal of the first switch; a third terminal of the second switch is connected to the input terminal of the angle-cutting chip through the fourth resistor; a terminal of the fifth resistor is ground; the other terminal of the fifth resistor is connected to a terminal of the sixth resistor and a terminal of the fourth resistor and the other terminal of the sixth resistor receives a second reference voltage.

Wherein the lower limit value of the angle-cutting voltage is 10 times of the input voltage input from the input terminal of the angle-cutting chip.

Wherein when the first voltage is less than the threshold voltage, the control signal output from the output terminal of the comparison module is in high electrical level; the first switch is turned on, the second switch is turn off, the lower limit value of the angle-cutting voltage satisfies the following equation:

$$VGH=10*V2*R5/(R5+R6)$$

wherein, VGH is the lower limit value of the angle-cutting voltage, V2 is the second reference voltage, R5 is the resistance value of the fifth resistor, R6 is the resistance value of the sixth resistor.

Wherein when the first voltage is greater than the threshold voltage, the output terminal of the comparison module outputs low electrical level, the first switch is turned off, and the second switch is turned on, the lower limit value of the angle-cutting voltage satisfies the following equation:

$$VGH=10*V2*R45/(R45+R6)$$

$$R45=R4*R5/R4+R5$$

Wherein, VGH is the lower limit value of the angle-cutting voltage, V2 is the second reference voltage, R4 is the resistance value of the fourth resistor, R5 is the resistance value of the fifth resistor, R6 is the resistance value of the sixth resistor.

Wherein the first switch and second switch are N-type MOS transistor, the first terminal is gate electrode, the second terminal is source electrode, and the third terminal is drain electrode.

Wherein the angle-cutting circuit further including an angle-cutting module connected to the output terminal of the angle-cutting chip, the angle-cutting module is cutting the angle of the substrate of the display panel according to the angle-cutting voltage.

Wherein the angle-cutting chip further including a second comparator, a seventh resistor, and an eighth resistor; the output terminal of the angle-cutting chip is ground through the seventh resistor and the eighth resistor; the first input terminal of the second comparator is connected between the seventh resistor and the eighth resistor; the second input terminal of the second comparator is connected to the input terminal of the angle-cutting chip; the output terminal of the second comparator is coupled to the reset terminal of the angle-cutting chip.

By the technology described above, the advantage of the present application is: the angle-cutting circuit in the present application includes the angle-cutting chip, the comparison module and the adjustment module, the adjustment module is coupled to the angle-cutting chip and the comparison module; the output terminal of the angle-cutting chip is used to output the angle-cutting voltage, the first input terminal of the comparison module is coupled to the output terminal of the angle-cutting chip to obtain the first voltage; the first voltage is compared to the preset threshold voltage in the comparison module, when the first voltage is less than the threshold voltage, a control signal is generated from the comparison module, and the lower limit value of the angle-cutting voltage is raised by the adjustment module according to the control signal. The lower limit value of the angle-cutting voltage is increased to offset the decreasing of the lower limit value of the angle-cutting voltage caused by the delay of the comparison module, thereby increasing the accuracy of angle-cutting voltage, and improve product performance.

BRIEF DESCRIPTION OF THE DRAWINGS

In order to more clearly illustrate the embodiments of the present application or prior art, the following figures will be described in the embodiments are briefly introduced. It is obvious that the drawings are merely some embodiments of the present application, those of ordinary skill in this field can obtain other figures according to these figures without paying the premise.

DETAILED DESCRIPTION OF PREFERRED EMBODIMENTS

Embodiments of the present application are described in detail with the technical matters, structural features, achieved objects, and effects with reference to the accompanying drawings as follows. It is clear that the described embodiments are part of embodiments of the present application, but not all embodiments. Based on the embodiments of the present application, all other embodiments to those of ordinary skill in the premise of no creative efforts obtained should be considered within the scope of protection of the present application.

Specifically, the terminologies in the embodiments of the present application are merely for describing the purpose of the certain embodiment, but not to limit the invention. Examples and the claims be implemented in the present application requires the use of the singular form of the book "an", "the" and "the" are intend to include most forms unless the context clearly dictates otherwise. It should also be understood that the terminology used herein that "and/or"

means and includes any or all possible combinations of one or more of the associated listed items.

Figure 1:
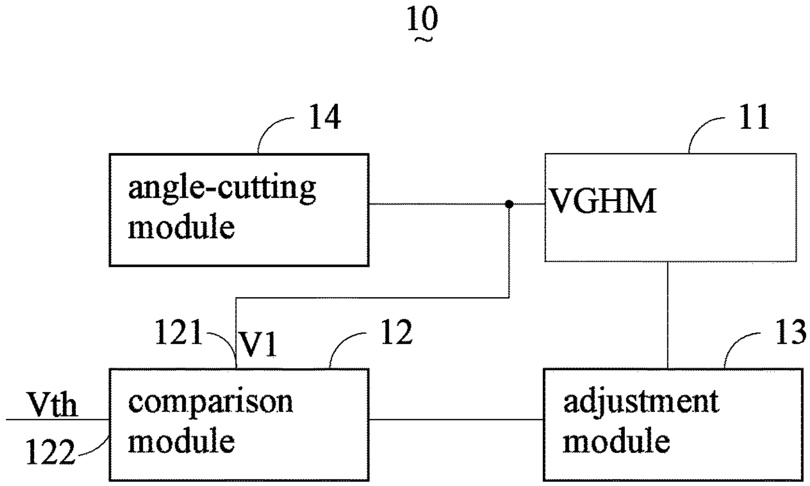
FIG. 1 is a schematic structural view of an angle-cutting circuit according to a first embodiment of the present application.

Referring to FIG. 1, FIG. 1 is a schematic structural view of an angle-cutting circuit according to a first embodiment of the present application. The angle-cutting circuit of the present embodiment is used to cutting the angle of the substrate for a display panel, as shown in FIG. 1. The angle-cutting circuit 10 includes an angle-cutting chip 11, a comparison module 12, an adjustment module 13 and an angle-cutting module 14.

Wherein the adjustment module 13 is coupled to the angle-cutting chip 11 and the comparison module 12. The output terminal VGHM of the angle-cutting chip 11 is used to output an angle-cutting voltage Vout. The first input terminal 121 of the comparison module 12 is coupled to the output terminal VGHM of the angle-cutting chip 11. The second input terminal 122 of the comparison module 122 has a preset threshold voltage Vth, the preset threshold voltage Vth is preferably set by the angle-cutting circuit 10 at the factory. In another embodiment, those of ordinary skill in this field can completely sets the first threshold voltage Vth by other means, e.g., according to the actual needs of the user to set the threshold of the first threshold voltage Vth. The first input terminal 121 of the comparison module 12 obtains a first voltage V1 from the output terminal VGHM of the angle-cutting chip 11, and the comparison module 12 compares the obtained first voltage V1 with the preset threshold voltage Vth. When the first voltage V1 is greater than the threshold voltage Vth judged by the comparison module 12, the output terminal VGHM of the angle-cutting chip 11 keeps output the angle-cutting voltage Vout. When the first voltage V1 is less than the threshold voltage Vth judged by the comparison module 12, the comparison module 12 generates a control signal, the adjustment module 13 obtains the control signal from the comparison module 12, and raise the lower limit value of the angle-cutting voltage Vout according to the control signal.

The angle-cutting module 14 is connected to the output terminal VGHM of the angle-cutting chip 11 to obtain the angle-cutting voltage Vout and the angle-cutting module 14 is cutting the angle of the substrate of the display panel (not shown) according to the angle-cutting voltage Vout.

In this embodiment, by judging the first voltage V1 is less than the threshold voltage Vth by the comparison module 12, the comparison module 12 generates a control signal, the adjustment module 13 obtains the control signal from the comparison module 12, and raise the lower limit value of the angle-cutting voltage Vout according to the control signal to enlarge the lower limit value of the angle-cutting voltage Vout and thereby offsetting the lower limit value of the angle-cutting voltage becomes small caused by the delay of the comparator, thereby increasing the accuracy of the angle-cutting voltage, and enhance product performance.

Figure 2:
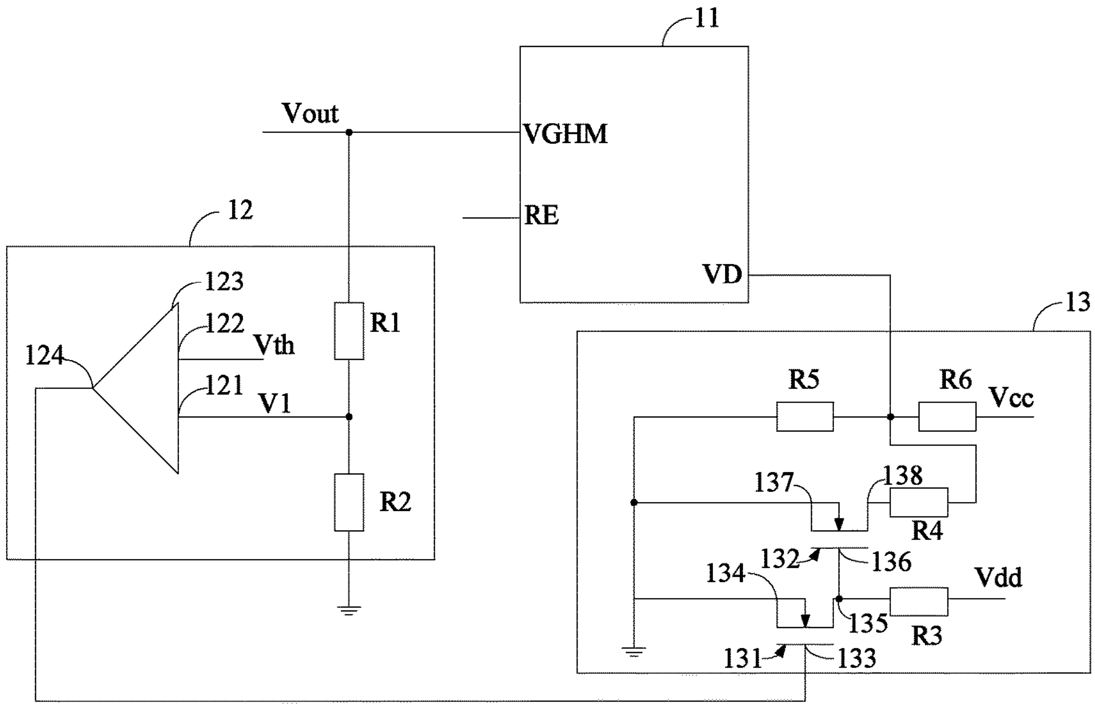
FIG. 2 is a schematic circuit diagram of the angle-cutting circuit according to a second embodiment of the present application.

Referring to FIG. 2, FIG. 2 is a schematic circuit diagram of the angle-cutting circuit according to a second embodiment of the present application. The angle-cutting circuit the present embodiment is described based on the angle-cutting circuit 10 disclosed in the first embodiment. As illustrated in FIG. 2, the comparison module 12 includes a first comparator 123, a first resistor R1 and a second resistor R2, one terminal of the first resistor R1 is connected to the output terminal VGHM of the angle-cutting chip 11. The other terminal of the first resistor R1 is grounded through the second resistor R2, a first input terminal of the first comparator 123 is the first input terminal 121 of the comparison module 12. The first input terminal of the first comparator 123 is connected between the first resistor R1 and the second resistor R2. The second input terminal of the first comparator 123 is the second input terminal 122 of the comparison module 12. The second input terminal 122 of the first comparator 123 input a threshold voltage Vth. The output terminal 124 of the first comparator 123 is the output terminal of the comparison module 12.

The adjustment module 13 includes a first switch 131, a second switch 132, a third resistor R3, a fourth resistor R4, a fifth resistor R5 and a sixth resistor R6, a first terminal 133 of the first switch 131 is connected to the output terminal 124 of the first comparator 123. A second terminal 134 of the first switch 131 and a second terminal 137 of the second switch 132 are ground. A third terminal 135 of the first switch 131 receives a first reference voltage Vdd via a third resistor R3. A first terminal 136 of the second switch 132 is connected to the third terminal 135 of the first switch 131. A third terminal 138 of the second switch 132 is connected to the input terminal VD of the angle-cutting chip 11 through the fourth resistor R4. A terminal of the fifth resistor R5 is ground, the other terminal of the fifth resistor R5 is connected to a terminal of the sixth resistor R6 and the input terminal VD of the angle-cutting chip 11. The other terminal of the sixth resistor R6 receives a second reference voltage Vcc.

Preferably, the lower limit value VGH of the angle-cutting voltage Vout is 10 times of the input voltage Vvd input from the input terminal VD of the angle-cutting chip 11, such as VGH=10* Vvd.

When the first voltage V1 is greater than the threshold voltage Vth, there is no flipping of the first comparator 123, the delay of the first comparator 123 does not affect the angle-cutting voltage Vout, the output terminal 124 of the comparison module 12 outputs low electrical level, the first switch 131 is turned off, and the second switch 132 is turned on, then the fourth resistor R44 and the fifth resistor R5 are connected in parallel, the sixth resistor R6 is connected in series with the parallel connected fourth resistor R4 and the fifth resistor R5. The lower limit value VGH of the angle-cutting voltage Vout satisfies the following equation:

$$VGH=10*V2*R45/(R45+R6) \quad (1)$$

$$R45=R4*R5/R4+R5 \quad (2)$$

Wherein, VGH is the lower limit value of the angle-cutting voltage Vout, V2 is the second reference voltage Vcc, R4 is the resistance value of the fourth resistor, R5 is the resistance value of the fifth resistor, R6 is the resistance value of the sixth resistor.

When the first voltage V1 is less than the threshold voltage Vth, the output of the first comparator 123 is inverted, the delay of the first comparator 123 influences the lower limit value VGH of the angle-cutting voltage Vout, then the output terminal 124 of the comparison module 12 outputs the control signal in high electrical level, the first switch 131 is turned on, the second switch 132 is turned off, the lower limit value VGH of the angle-cutting voltage Vout satisfies the following equation:

$$VGH=10*V2*R5/(R5+R6) \quad (3)$$

Preferably, the first switch 131 and second switch 132 are N-type MOS transistor, the first terminal 133 of the first switch 131 is gate electrode, the second terminal 134 of the first switch 131 is source electrode, the third terminal 135 of the first switch 131 is drain electrode. The first terminal 136 of the second switch 132 is gate electrode, the second terminal 137 of the second switch 132 is source electrode, the third terminal 138 of the second switch 132 is drain electrode. Wherein, 10*V2*R5/(R5+R6) is greater than 10*V2*R45/(R45+R6), therefore when the first voltage V1 is less than the threshold voltage Vth, the lower limit value VGH of the angle-cutting voltage Vout is greatly increased, offsetting the decreasing of the lower limit value VGH of the angle-cutting voltage Vout caused by the delay of the first comparator 123, thereby increasing the accuracy of angle-cutting voltage Vout, and improve product performance.

Figure 3:
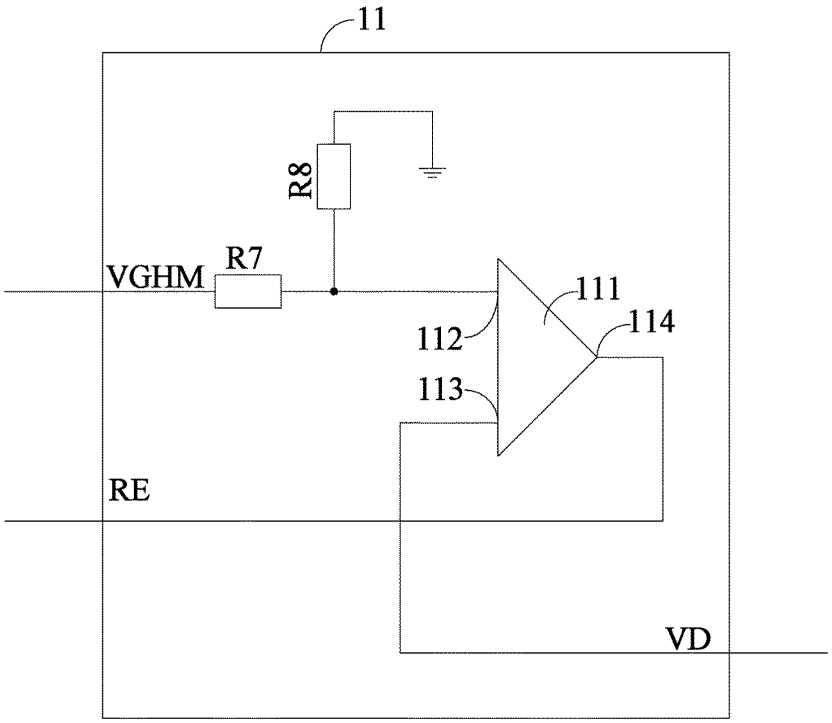
FIG. 3 is a schematic circuit diagram of the angle-cutting chip illustrated in FIG. 2.

Further, as shown in FIG. 3, the angle-cutting chip 11 includes a second comparator 111, a seventh resistor R7, and an eighth resistor R8. The output terminal VGHM of the angle-cutting chip 11 is ground through the seventh resistor R7 and the eighth resistor R8. The first input terminal 112 of the second comparator 111 is connected between the seventh resistor R7 and the eighth resistor R8, the second input terminal 113 of the second comparator 111 is connected to the input terminal VD of the angle-cutting chip 11. The output terminal 114 of the second comparator 111 is coupled to the reset terminal RE of the angle-cutting chip 11. Wherein, the resistance value of the seventh resistor R7 is n times of the resistance value of the eighth resistor R8, n is a positive integer equal to or greater than 1. Preferably the resistance value of the seventh resistor R7 is 9 times of the resistance value of the eighth resistor R8.

Figure 4:
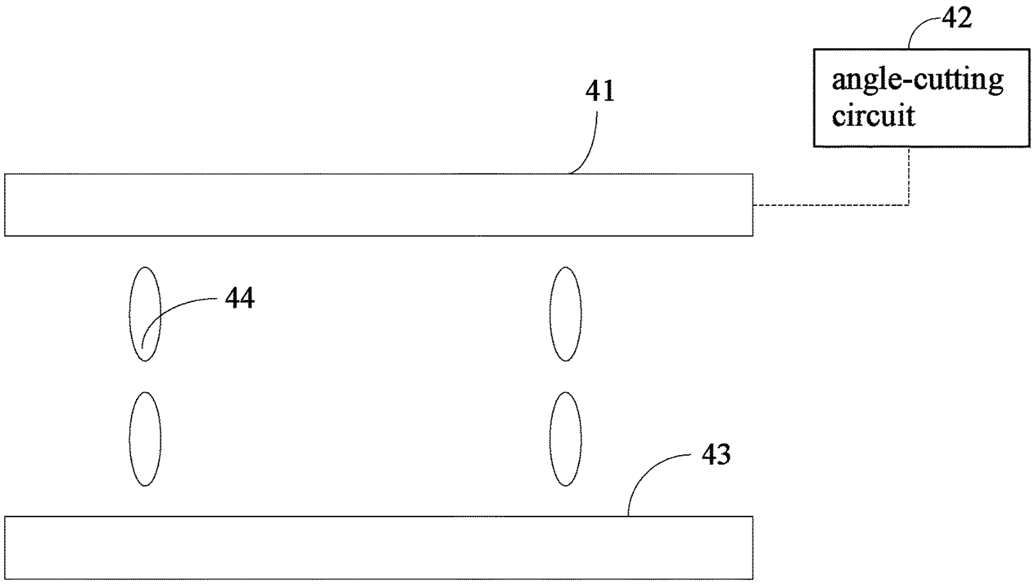
FIG. 4 is a schematic structural view of a display panel according to the first embodiment of the present application.

The present invention further provides a display panel of the first embodiment, as shown in FIG. 4. The display panel disclosed in the present embodiment at least includes an upper substrate 41 and the angle-cutting circuit 42, wherein the display panel of the present embodiment includes the upper substrate 41 and a lower substrate 43 disposed opposite to the upper substrate 41, and a liquid crystal layer 44 disposed between the upper substrate 41 and the lower substrate 43. The angle-cutting circuit 42 is used to cutting the angle of the upper substrate 41 and the lower substrate 43, the angle-cutting circuit 42 is as the circuit described in the above-described embodiments, not repeat them here.

The angle-cutting circuit of the present invention includes the angle-cutting chip, the comparison module and the adjustment module, the adjustment module is coupled to the angle-cutting chip and the comparison module; the output terminal of the angle-cutting chip is used to output the angle-cutting voltage, the first input terminal of the comparison module is coupled to the output terminal of the angle-cutting chip to obtain the first voltage; the first voltage is compared to the preset threshold voltage in the comparison module, when the first voltage is less than the threshold voltage, a control signal is generated from the comparison module, and the lower limit value of the angle-cutting voltage is raised by the adjustment module according to the control signal. The lower limit value of the angle-cutting voltage is increased to offset the decreasing of the lower limit value of the angle-cutting voltage caused by the delay of the comparison module, thereby increasing the accuracy of angle-cutting voltage, and improve product performance.

Above are embodiments of the present application, which does not limit the scope of the present application. Any modifications, equivalent replacements or improvements within the spirit and principles of the embodiment described above should be covered by the protected scope of the invention.

What is claimed is:

1. An angle-cutting circuit comprising: an angle-cutting chip, a comparison module and an adjustment module; wherein the adjustment module is coupled to the angle-cutting chip and the comparison module; an output terminal of the angle-cutting chip is used to output an angle-cutting voltage, a first input terminal of the comparison module is coupled to the output terminal of the angle-cutting chip to obtain a first voltage; the first voltage is compared to a preset threshold voltage in the comparison module, when the first voltage is less than the threshold voltage, a control signal is generated from the comparison module, and a lower limit value of the angle-cutting voltage is raised by the adjustment module according to the control signal;

wherein the comparison module comprising a first comparator, a first resistor and a second resistor, one terminal of the first resistor is connected to the output terminal of the angle-cutting chip, the other terminal of the first resistor is grounded through the second resistor, a first input terminal of the first comparator is connected between the first resistor and the second resistor, the second input terminal of the first comparator input a threshold voltage;

wherein the adjustment module comprising a first switch, a second switch, a third resistor, a fourth resistor, a fifth resistor and a sixth resistor; a first terminal of the first switch is connected to the output terminal of the first comparator, a second terminal of the first switch and a second terminal of the second switch are ground; a third terminal of the first switch receives a first reference voltage via the third resistor; a first terminal of the second switch is connected to the third terminal of the first switch; a third terminal of the second switch is connected to the input terminal of the angle-cutting chip through the fourth resistor; a terminal of the fifth resistor is ground; the other terminal of the fifth resistor is connected to a terminal of the sixth resistor and a terminal of the fourth resistor and the other terminal of the sixth resistor receives a second reference voltage.

2. The angle-cutting circuit according to claim 1, wherein the lower limit value of the angle-cutting voltage is 10 times of the input voltage input from the input terminal of the angle-cutting chip.

3. The angle-cutting circuit according to claim 2, wherein when the first voltage is less than the threshold voltage, the control signal output from the output terminal of the comparison module is in high electrical level; the first switch is turned on, the second switch is turn off, the lower limit value of the angle-cutting voltage satisfies the following equation:

$$VGH=10*V2*R5/(R5+R6)$$

wherein, VGH is the lower limit value of the angle-cutting voltage, V2 is the second reference voltage, R5 is the resistance value of the fifth resistor, R6 is the resistance value of the sixth resistor.

4. The angle-cutting circuit according to claim 2, wherein when the first voltage is greater than the threshold voltage, the output terminal of the comparison module outputs low electrical level, the first switch is turned off, and the second switch is turned on, the lower limit value of the angle-cutting voltage satisfies the following equation:

$$VGH=10*V2*R45/(R45+R6)$$

$$R45=R4*R5/R4+R5$$

where VGH is the lower limit value of the angle-cutting voltage, V2 is the second reference voltage, R4 is the resistance value of the fourth resistor, R5 is the resistance value of the fifth resistor, R6 is the resistance value of the sixth resistor.

5. The angle-cutting circuit according to claim 1, wherein the first switch and second switch are N-type MOS transistor, the first terminal is gate electrode, the second terminal is source electrode, and the third terminal is drain electrode.

6. The angle-cutting circuit according to claim 1, wherein the angle-cutting chip further comprising a second comparator, a seventh resistor, and an eighth resistor; the output terminal of the angle-cutting chip is ground through the seventh resistor and the eighth resistor; a first input terminal of the second comparator is connected between the seventh resistor and the eighth resistor; a second input terminal of the second comparator is connected to an input terminal of the angle-cutting chip; an output terminal of the second comparator is coupled to a reset terminal of the angle-cutting chip.

7. A display panel, comprising at least a substrate and an angle-cutting circuit, the angle-cutting circuit is used to cut the angle of the substrate, the angle-cutting circuit comprising: an angle-cutting chip, a comparison module and an adjustment module; wherein the adjustment module is coupled to the angle-cutting chip and the comparison module; an output terminal of the angle-cutting chip is used to output an angle-cutting voltage, a first input terminal of the comparison module is coupled to the output terminal of the angle-cutting chip to obtain a first voltage; the first voltage is compared to a preset threshold voltage in the comparison module, when the first voltage is less than the threshold voltage, a control signal is generated from the comparison module, and a lower limit value of the angle-cutting voltage is raised by the adjustment module according to the control signal;

wherein the comparison module comprising a first comparator, a first resistor and a second resistor, one terminal of the first resistor is connected to the output terminal of the angle-cutting chip, the other terminal of the first resistor is grounded through the second resistor, a first input terminal of the first comparator is connected between the first resistor and the second resistor, the second input terminal of the first comparator input a threshold voltage;

wherein the adjustment module comprising a first switch, a second switch, a third resistor, a fourth resistor, a fifth resistor and a sixth resistor; a first terminal of the first switch is connected to the output terminal of the first comparator, a second terminal of the first switch and a second terminal of the second switch are ground; a third terminal of the first switch receives a first reference voltage via the third resistor; a first terminal of the second switch is connected to the third terminal of the first switch; a third terminal of the second switch is connected to the input terminal of the angle-cutting chip through the fourth resistor; a terminal of the fifth resistor is ground; the other terminal of the fifth resistor is connected to a terminal of the sixth resistor and a terminal of the fourth resistor and the other terminal of the sixth resistor receives a second reference voltage.

8. The display panel according to claim 7, wherein the lower limit value of the angle-cutting voltage is 10 times of the input voltage input from the input terminal of the angle-cutting chip.

9. The display panel according to claim 8, wherein when the first voltage is less than the threshold voltage, the control signal output from the output terminal of the comparison module is in high electrical level; the first switch is turned on, the second switch is turn off, the lower limit value of the angle-cutting voltage satisfies the following equation:

$$VGH=10*V2*R5/(R5+R6)$$

wherein, VGH is the lower limit value of the angle-cutting voltage, V2 is the second reference voltage, R5 is the resistance value of the fifth resistor, R6 is the resistance value of the sixth resistor.

10. The display panel according to claim 8, wherein when the first voltage is greater than the threshold voltage, the output terminal of the comparison module outputs low electrical level, the first switch is turned off, and the second switch is turned on, the lower limit value of the angle-cutting voltage satisfies the following equation:

$$VGH=10*V2*R45/(R45+R6)$$

$$R45=R4*R5/R4+R5$$

where VGH is the lower limit value of the angle-cutting voltage, V2 is the second reference voltage, R4 is the resistance value of the fourth resistor, R5 is the resistance value of the fifth resistor, R6 is the resistance value of the sixth resistor.

11. The display panel according to claim 7, wherein the first switch and second switch are N-type MOS transistor, the first terminal is gate electrode, the second terminal is source electrode, and the third terminal is drain electrode.

12. The display panel according to claim 7, wherein the angle-cutting chip further comprising a second comparator, a seventh resistor, and an eighth resistor; the output terminal of the angle-cutting chip is ground through the seventh resistor and the eighth resistor; a first input terminal of the second comparator is connected between the seventh resistor and the eighth resistor; a second input terminal of the second comparator is connected to an input terminal of the angle-cutting chip; an output terminal of the second comparator is coupled to a reset terminal of the angle-cutting chip.

* * * * *